United States Patent
Jasmin

(10) Patent No.: US 9,876,463 B2
(45) Date of Patent: Jan. 23, 2018

(54) ADJUSTABLE END CLAMP FOR MOUNTING SOLAR PANELS TO ROOFS

(71) Applicant: Sunmodo Corporation, Vancouver, WA (US)

(72) Inventor: Roland Jasmin, Lake Oswego, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 15/130,913

(22) Filed: Apr. 15, 2016

(65) Prior Publication Data
US 2017/0302221 A1    Oct. 19, 2017

(51) Int. Cl.
| F24J 2/52 | (2006.01) |
| H02S 20/23 | (2014.01) |
| H02S 30/10 | (2014.01) |

(52) U.S. Cl.
CPC .............. *H02S 20/23* (2014.12); *H02S 30/10* (2014.12)

(58) Field of Classification Search
CPC ........ F24J 2/5258; F24J 2/5245; F24J 2/5264; F24J 2002/4672; F24J 2002/5218; F24J 2002/5226; Y02E 10/47; H02S 20/23; F16B 2/065
See application file for complete search history.

(56) References Cited

U.S. PATENT DOCUMENTS

| 4,239,555 | A | * | 12/1980 | Scharlack | ............ | H01L 31/048 136/251 |
| 5,501,754 | A | * | 3/1996 | Hiraguri | ............ | E04F 15/02476 156/71 |
| 7,435,134 | B2 | | 10/2008 | Lenox | | |

(Continued)

FOREIGN PATENT DOCUMENTS

| AU | 2010200545 A1 | 2/2010 |
| DE | 202011107843 U1 | 1/2012 |

(Continued)

OTHER PUBLICATIONS

Solar panel mounting system, solar mounting bracket, solar panel adjustable end clamps, Xiamen Empery Machinery & Electronics Co., Ltd., Accessed on the Internet at: http://www.alibaba.com/product-detail/Solar-panel-mounting-system-solar-mounting_1900136975.html on Apr. 4, 2016.

(Continued)

*Primary Examiner* — Gisele Ford
(74) *Attorney, Agent, or Firm* — Stone Creek Services LLC; Alan M Flum

(57) ABSTRACT

Disclosed is a system and device (10, 100, 200, 300) for mounting a solar panel (11) to a roof (43). The device (10, 100, 200, 300) allows for the mounting of solar panels (11) with various thicknesses using an end clamp (12) and base (13) assembly where the end clamp (12) is height adjustable along an alignment portion (20) that projects vertically upward from a planar top surface (19) of the base (13). The (Continued)

end clamp (12) includes an end portion (18) with a three-angle bearing surface (27) that engages both a side surface and a groove (23) within a side surface of the alignment portion (20). The solar panel (11) frame is secured from the top by an upper clamping surface of the end clamp (12) to the alignment portion (20) and the top surface of the base (13).

10 Claims, 13 Drawing Sheets

(56) References Cited

U.S. PATENT DOCUMENTS

| | | |
|---|---|---|
| 7,827,656 B2 | 11/2010 | Schweikert |
| 8,176,693 B2 | 5/2012 | Abbott et al. |
| 8,746,646 B2 | 6/2014 | Fluhrer et al. |
| 8,938,932 B1 | 1/2015 | Wentworth et al. |
| 9,097,443 B2 | 8/2015 | Liu et al. |
| 9,175,878 B2 | 11/2015 | Kemmer et al. |
| 2008/0244881 A1 | 10/2008 | Zante |
| 2011/0138585 A1 | 6/2011 | Kmita et al. |
| 2011/0214365 A1 | 9/2011 | Aftanas |
| 2011/0260027 A1* | 10/2011 | Farnham, Jr. .......... F24J 2/5207 248/309.1 |
| 2011/0314752 A1* | 12/2011 | Meier ................ F24J 2/5211 52/173.3 |
| 2012/0102854 A1 | 5/2012 | Meier et al. |
| 2012/0193310 A1* | 8/2012 | Fluhrer .............. F24J 2/5203 211/41.1 |
| 2012/0222273 A1 | 9/2012 | Abbott et al. |
| 2013/0048816 A1 | 2/2013 | Wentworth et al. |
| 2013/0161462 A1 | 6/2013 | Haddock |
| 2013/0200245 A1 | 8/2013 | Markiewicz et al. |
| 2014/0041706 A1 | 2/2014 | Haddock et al. |
| 2014/0042286 A1 | 2/2014 | Jaffari |
| 2014/0174510 A1 | 6/2014 | Kanbara |
| 2014/0202525 A1 | 7/2014 | Janssens et al. |
| 2015/0101997 A1 | 4/2015 | Liu et al. |
| 2015/0102194 A1 | 4/2015 | Liu |
| 2015/0168021 A1 | 6/2015 | Wentworth et al. |
| 2015/0288320 A1* | 10/2015 | Stearns ................ H02S 20/23 52/173.3 |
| 2015/0311606 A1 | 10/2015 | Meine et al. |
| 2016/0043689 A1 | 2/2016 | McPheeters |
| 2016/0069592 A1 | 3/2016 | Giraudo et al. |
| 2016/0111995 A1* | 4/2016 | Nayar ................ H02S 20/23 211/41.1 |
| 2016/0233820 A1* | 8/2016 | Redel .................. F16B 7/187 |
| 2016/0268958 A1* | 9/2016 | Wildes ................. H02S 20/23 |

FOREIGN PATENT DOCUMENTS

| | | |
|---|---|---|
| DE | 202012006839 U1 | 10/2012 |
| DE | 202014009489 U1 | 1/2015 |

OTHER PUBLICATIONS

Tough Trac Lite Rail Installation Manual, Nov. 2014, p. 11, Touch Trac, Holbrook, NY.
Tough Trac Continuous Array Portrait Installation Manual, Jul. 2011, pp. 8-9, Touch Trac, Holbrook, NY.
Solar Panel mounting adjustable end Clamps/Solar Panel Clamps/ Solar clamps kits, Xiamen Grace Solar Technology Co., Ltd., Accessed on the Internet at: racesolar.en.alibaba.com/product/ 551736946-220766304/Solar_Panel_mounting_adjustable_ end_Clamps_Solar_Panel_Clamps_Solar_clamps_kits.html on Apr. 4, 2016.
Training on how to install Lock Solar, solar mounting products, Nov. 2013, p. 14, Lock Solar Pty. Ltd., Brisbane, Australia.
Chiko End Clamp, Accessed on the Internet at: http://www. alphaenergy.com.au/Solar-Power/CHIKO-SOLAR-RACKING-ACCESSORIES on Apr. 4, 2016.
New Product Introduction—Self Grounding System, Oct. 2014, Sunmodo Corporation, Vancouver, WA.

* cited by examiner

ADJUSTABLE END CLAMP FOR MOUNTING SOLAR PANELS TO ROOFS

FIELD OF INVENTION

This disclosure relates to a device for mounting solar panels to roofs of building structures.

BACKGROUND

Solar Panels can be mounted to various types of roof structures, such as pitched shingle roofs, tile roofs, or metal roofs. Solar panels are commonly mounted to rails that can span the length of one or more solar panels. The rails in turn are mounted to the roof structures using L-foot brackets and other mounting systems. Alternatively, the solar panels can be mounted directly to the roof by using rail-less mounting systems.

Solar panels can be secured to rails or rail-less mounting systems using clamping brackets such as end clamps and mid-clamps. Mid-clamps are designed to be positioned between two solar panels and include two clamping surfaces where each clamping surface engages the top of the frame of a corresponding solar panel of the two solar panels. End-clamps have a single clamping surface are generally designed to engage the top of the frame of a single solar panel.

Solar panel installers and manufacturers seek to simplify installation and minimize system costs. One of the challenges faced is that solar panels are not standardized around a single height. The height can vary according to manufacturer. This requires careful planning when specifying solar panel for installation and requires solar equipment manufacturers to either choose which solar panels their mounting system will support or provide a variety of parts to accommodate a variety of thicknesses.

SUMMARY

The inventor developed a solar panel mounting device with a solar panel clamping assembly is height adjustable in discrete steps in order to accommodate solar panel with a variety of thickness. The device can be configured only to accommodate specific standard thicknesses in order to simply installation and reduce installation error. While other height-adjustable solar panel mounting devices exist, they generally depend on a slidably captive tongue and groove arrangement. The inventor recognized that these suffer from several problems that the device described in this disclosure overcomes. First, solar panel mounting clamps, particularly end clamps, tend to rotate counterclockwise away from the solar panel. Manufacturers compensate for this by providing a small toe or angle on the bottom surface of the end clamp. However, devices utilizing slidably captive tongue and groove arrangements, and particular those devices where the clamp is slidably captive on two sides, tend to bind during tightening from rotational torque. Second, most slidably captive clamping devices must be preset to the correct height before installation. These clamps tend have their grooves placed in equally spaced intervals increasing the chance of error before installation.

The presently disclosed device is not slidably captive and does not suffer from the problems described above. Instead, the device relies on complementary three-angle bearing surfaces that use both the rotational and downward forces to hold the clamp securely. The device uses an end clamp with a three-angle bearing surface to engage both a groove and the outside surface of an alignment portion. The alignment portion projects perpendicularly upward from the planar top surface of a base. The end clamp includes an upper clamping portion positioned above the alignment portion, a mid-portion projecting directly downward from the upper clamping portion, and an end portion projecting directly and obliquely away from the mid-portion and toward the alignment portion. The end portion includes the three-angle bearing surface. The three-angle bearing surface engages co-planarly against both a first vertical outside surface of the alignment portion and a groove extending longitudinally within the first vertical outside surface. A threaded fastener projects through the planar top surface and the alignment portion secures the upper clamping portion to the base. The upper clamping portion engages and secures the solar panel co-planarly against the planar top surface and a second vertical outside surface of the alignment portion. In additional to overcoming the deficiencies, recognized by the inventor, for captively sliding solar panel mounting clamps, the device of the present invention has the additional unexpected result of providing a clamp of greater structural integrity as compared a typical captively sliding solar mounting clamp using the same about of material.

The three-angle bearing surface can be configured where a first planar bearing surface of the three-angle bearing surface directly and obliquely extends from an upward facing outside surface of the end portion of the end clamp. A second planar bearing surface of the three-angle bearing surface directly and obliquely extends from the first planar bearing surface. A third planar bearing surface of the three-angle bearing surface extends directly and at an angle of 90-degrees or less with respect to the second planar bearing surface. The third planar bearing surface terminates at the downward-facing surface of the end portion of the end clamp making an oblique angle with it. As the end clamp is tightened, the three-angle bearing surface rotates to the alignment portion and the first planar bearing surface aligns vertically against the first vertical outside surface of the alignment portion. The downward forces co-planarly align the second and third planar bearing surfaces with corresponding planar surfaces within the groove.

This Summary introduces a selection of concepts in simplified form that are described the Detailed Description. The Summary is not intended to identify essential features or limit the scope of the claimed subject matter.

DRAWINGS

DETAILED DESCRIPTION

The following terms are used throughout this disclosure and are defined here for clarity and convenience. Throughout this disclosure, an end clamp is defined as solar panel mounting clamp that has a single clamping surface and is designed to engage the top of the frame of a solar panel. This is in contrast to mid-clamps that include two clamping surfaces spanning from the center of the clamp.

The terms "left," "right," "top," "bottom," "upper," "lower," "front," "back," "rear," "side," "vertical," and "horizontal" are relative terms used throughout the disclosure to aid in the understanding of the figures. Unless otherwise indicated, these terms are not used to denote absolute direction or orientation. They are not meant to imply a particular preference or limitation for a particular orientation or direction. In addition, measurements, including widths, heights, or thicknesses are given to help the reader understand the scale and advantage of the present disclosure. It should be understood by the reader that any dimension given is typical; other widths and heights are possible. Unless specified in the claims, the claimed invention is in no way limited to the measurements, widths, or ranges, recited in the Detailed Description.

Figure 1:
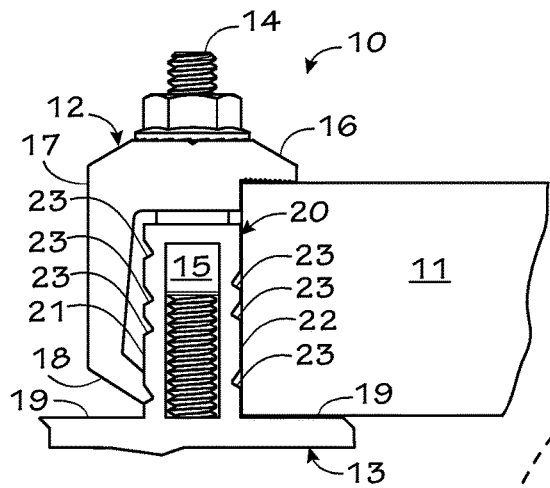
FIG. 1 illustrates, in side elevation view, a portion of a device for mounting solar panels to a roof in the lower most position and mounting a solar panel of corresponding height, the device including elements common to all disclosed embodiments.
Figure 2:
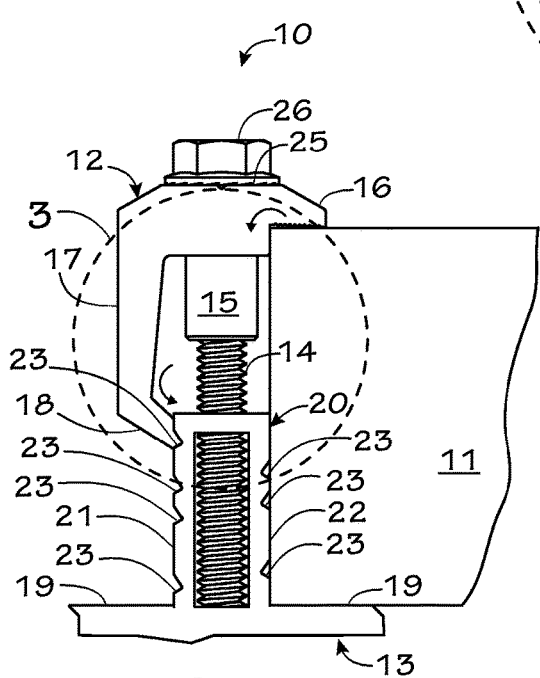
FIG. 2 illustrates in side elevation view, the device of FIG. 1 in the upper most position mounting and a solar panel of corresponding height.
Figure 3:
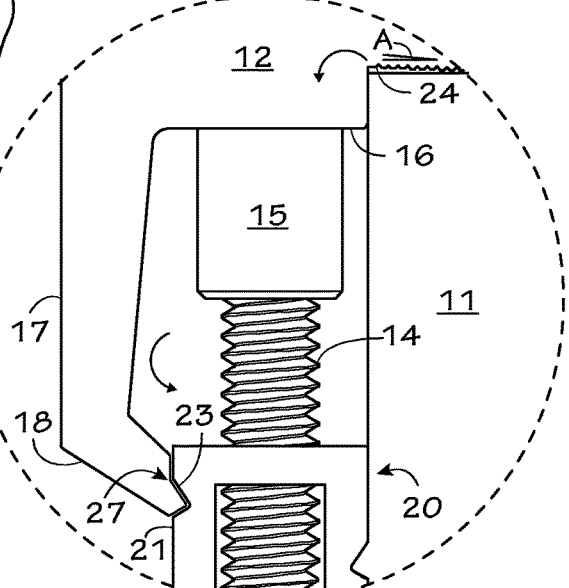
FIG. 3 illustrates a detail view of a portion of FIG. 2.

The following description is made with reference to figures, where like numerals refer to like elements throughout the several views. The overall disclosure can be best understood by careful study of FIGS. 1-4. FIGS. 1-4 illustrate a portion of a device 10 for mounting a solar panel 11 (FIGS. 1-3) to a roof and include elements common to all disclosed embodiments. FIG. 1 illustrates elements of a portion of the device 10 for mounting a solar panel 11 in the lower most position. FIG. 1 also illustrates a portion of a solar panel 11 of corresponding height. FIG. 2 illustrates a portion of the device 10 of FIG. 1 in the upper most position in order to accommodate a solar panel 11 thicker than shown in FIG. 1. FIG. 3 illustrates a detail view of a portion of FIG. 2, which is represented in FIG. 2 by a circle with broken lines.

Figure 4:
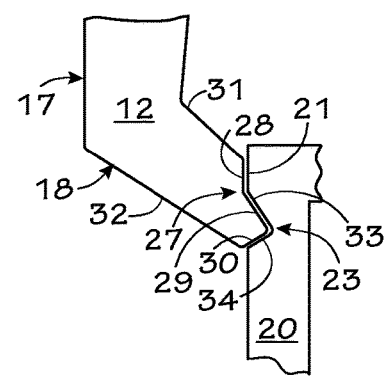
FIG. 4 illustrates a detail view of the three-angle bearing surface.

The features common to all illustrated embodiments are illustrated in FIGS. 1-2 and portions of FIGS. 1-2 are shown with additional detail in FIGS. 3-4. Referring to FIGS. 1-2, these common features include an end clamp 12, a portion of a base 13, a threaded fastener 14, and a hollow bolt 15. The device is shown secured to a portion of the solar panel 11. The end clamp 12 includes an upper clamping portion 16, a mid-portion 17, and an end portion 18. The base 13 includes a planar top surface 19 that is divided by an alignment portion 20 that projects directly and perpendicularly upward from the planar top surface 19. The alignment portion 20 includes two parallel outside surfaces shown in FIGS. 1-2 as a first outside surface 21 and a second outside surface 22. The first outside surface 21 and the second outside surface 22 are each illustrated with grooves 23 that extend along their length.

In order to secure the solar panel 11, the hollow bolt 15 engages the threaded fastener 14 and tightens the upper clamping portion 16 against the top of the solar panel 11 thereby securing the solar panel 11 co-planarly against the second outside surface 22 and the planar top surface 19. The end clamp 12 will tend to rotate as the hollow bolt 15 and the threaded fastener 14 are tightened. This is shown in FIGS. 2-3 by the counterclockwise rotational lines. Referring to FIG. 3, in order to keep the upper clamping portion 16 of the end clamp 12 from binding against the solar panel 11, the clamping portion contact surface 24 is manufactured with a slight inward angle A with respect to the upper clamping portion top surface 25 that makes contact with the of the bolt head 26 shown in FIG. 2. In FIG. 3, the angle A can typical be between 1-2 degrees and is sufficient to allow for rotation of the clamping portion contact surface 24 into a position co-planar with the top of the solar panel 11 as the hollow bolt 15 is tightened into the threaded fastener 14.

The end portion 18, which is illustrated extending obliquely and directly away from the mid-portion 17, terminates into a three-angle bearing surface 27. As illustrated, the three-angle bearing surface 27 engages co-planarly against both the first outside surface 21 and the groove 23 of the alignment portion 20. FIG. 4 show a detail view of a of the end portion 18 and a part of the mid-portion 17 of the end clamp 12 and the three-angle bearing surface 27. The three-angle bearing surface 27 includes a first planar bearing surface 28, a second planar bearing surface 29, and a third planar bearing surface 30. The first planar bearing surface 28 directly and obliquely extends from an upward facing outside surface 31 of the end portion 18 and aligns vertically against the first outside surface 21 of the alignment portion 20. The second planar bearing surface 29 extends directly and obliquely from the first planar bearing surface 28. The third planar bearing surface 30 extends directly and at an angle of 90-degrees or less with respect to the second planar bearing surface 29 and terminates at a downward facing outside surface 32 of the end portion 18, making an oblique angle. The upward facing outside surface 31 faces upward and inward with respect to the alignment portion 20. The downward facing outside surface 32 faces downward and outward with respect to the alignment portion 20.

The groove 23 in the alignment portion 20 is complementary in shape to the combination of the second planar bearing surface 29 and the third planar bearing surface 30 with the groove 23 including first planar groove surface 33 and a second planar groove surface 34. The first planar groove surface 33 co-planarly receives the second planar bearing surface 29 and second planar groove surface 34 co-planarly receives the third planar bearing surface 30.

Solar panels 11 can come in different thicknesses according to manufacturer or other factors. One of the advantages of the device 10 illustrated in FIGS. 1-4 and throughout this disclosure is that the grooves 23 can be set to specific positions based on industry standard solar panel thicknesses. This eliminates the need for the solar panel racking system manufacturer or installers to stock different end clamps or bases for different solar panels. It also eliminates ambiguity, thus reducing installation time, and installation error, by only providing discrete height settings corresponding to common panel thicknesses.

FIGS. 5-18 illustrate two embodiments, utilizing the principals described in FIGS. 1-4, showing each discrete height setting of the end clamp 12 in relation to the planar top surface 19 of the base 13. Each of FIGS. 5-18 illustrates a portion of a solar panel 11 of corresponding height. FIGS. 5-11 illustrate a rail-less device 100 for mounting a solar panel 11 where each figure shows the rail-less device 100 adjusted to thickness of a solar panel 11 of standard thickness. FIGS. 12-18 illustrate a rail-mounted device 200 for mounting a solar panel 11 where each figure shows the rail-mounted device 200 adjusted to thickness of a solar panel 11 of standard thickness. FIGS. 5-18 show seven of the grooves 23 on the alignment portion. In FIGS. 5-8 and FIGS. 12-15, the end clamp 12 engages one of four of the grooves 23 on the first outside surface 21. In FIGS. 9-11 and FIGS. 16-18, the end clamp 12 engages one of three of the grooves 23 are on the second outside surface 22. These can be spaced to correspond to seven standard solar panel thicknesses, for example, 0.031 m (1.22 in.), 0.033 m (1.30 in.), 0.040 m (1.57 in.), 0.042 m (1.65 in.), 0.044 m (1.73 in.), 0.046 m (1.81 in.), and 0.050 m (1.97 in.). However, the invention is not limited to these examples or to seven specific thicknesses. Other specific thicknesses or number of grooves 23 can be realized depending on the specific application or needs of the installers or manufacturers.

Figure 5:
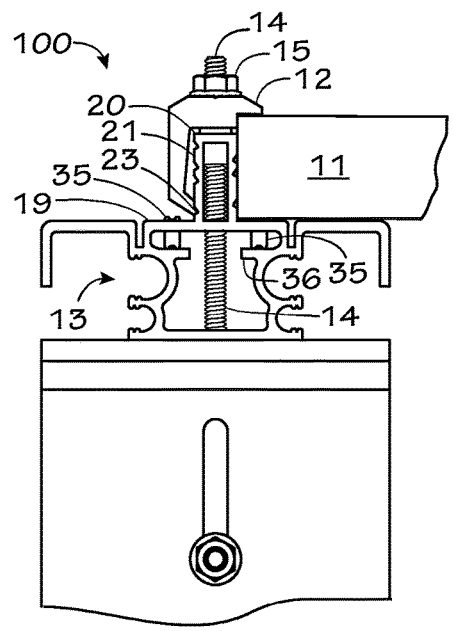
FIG. 5 illustrates in side elevation view, a portion of a rail-less embodiment of the solar panel mounting device adjusted to a first standard solar panel height.
Figure 6:
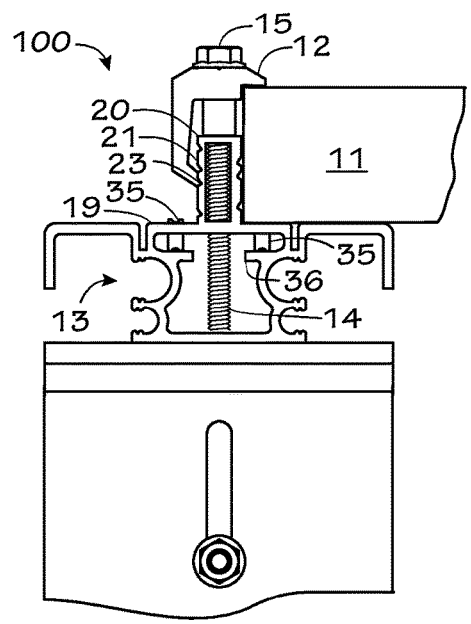
FIG. 6 illustrates in side elevation view, a portion of a rail-less embodiment of the solar panel mounting device adjusted to a second standard solar panel height.
Figure 7:
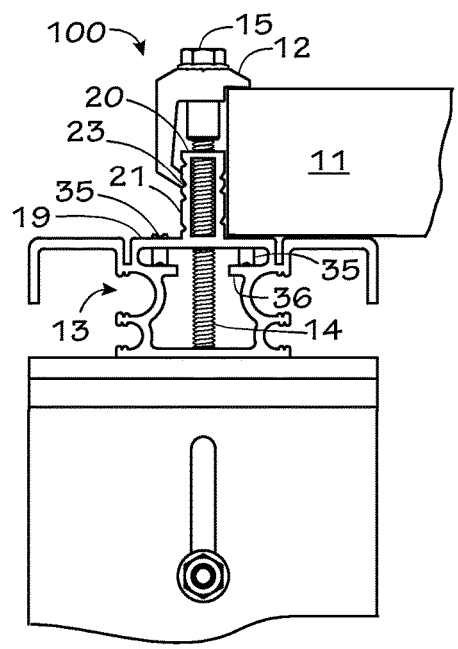
FIG. 7 illustrates in side elevation view, a portion of a rail-less embodiment of the solar panel mounting device adjusted to a third standard solar panel height.
Figure 8:
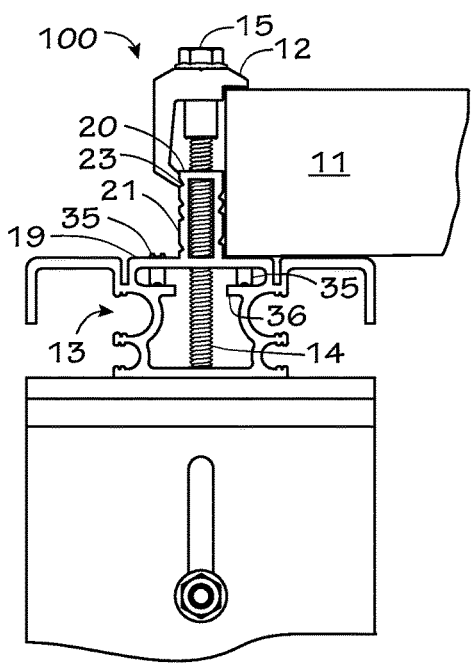
FIG. 8 illustrates in side elevation view, a portion of a rail-less embodiment of the solar panel mounting device adjusted to a fourth standard solar panel height.
Figure 9:
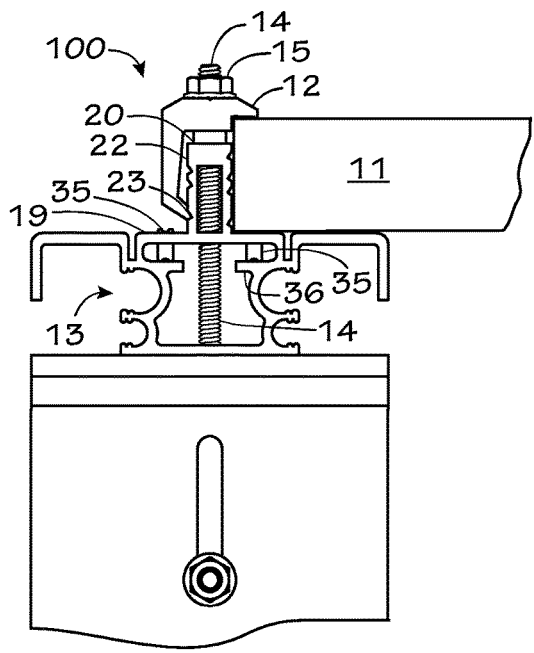
FIG. 9 illustrates in side elevation view, a portion of a rail-less embodiment of the solar panel mounting device adjusted to a fifth standard solar panel height.
Figure 10:
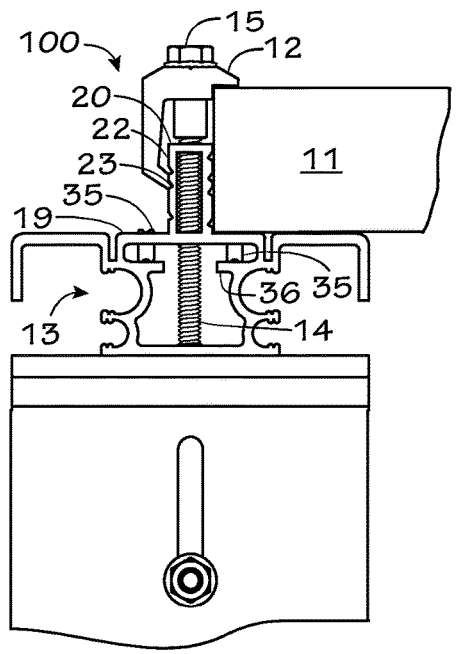
FIG. 10 illustrates in side elevation view, a portion of a rail-less embodiment of the solar panel mounting device adjusted to a sixth standard solar panel.
Figure 11:
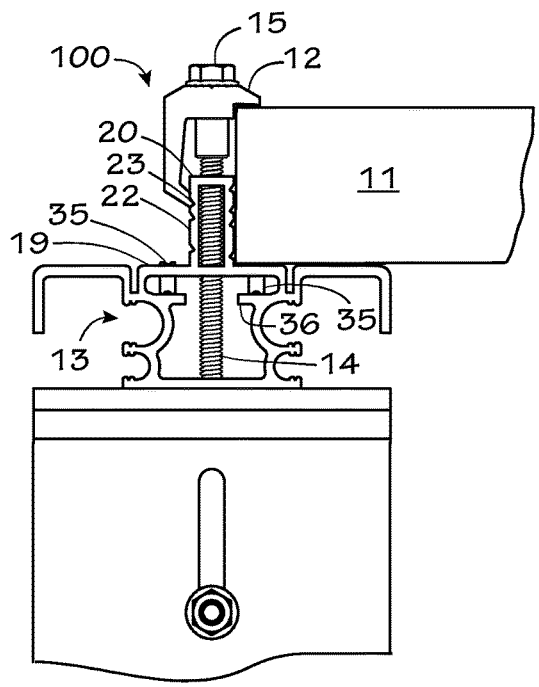
FIG. 11 illustrates in side elevation view, a portion of a rail-less embodiment of the solar panel mounting device adjusted to a seventh standard solar panel height.
Figure 12:
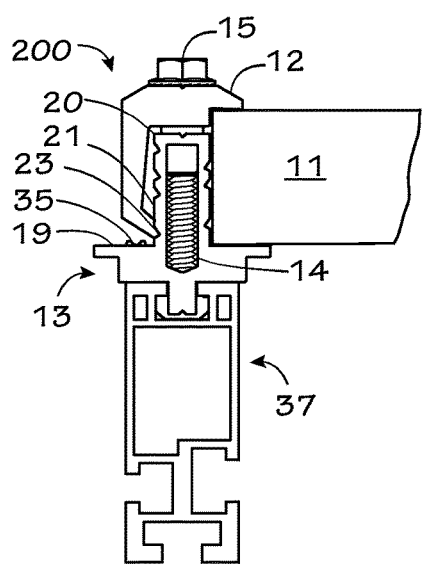
FIG. 12 illustrates in side elevation view, a portion of a rail-mounted embodiment of the solar panel mounting device adjusted to a first standard solar panel height.
Figure 13:
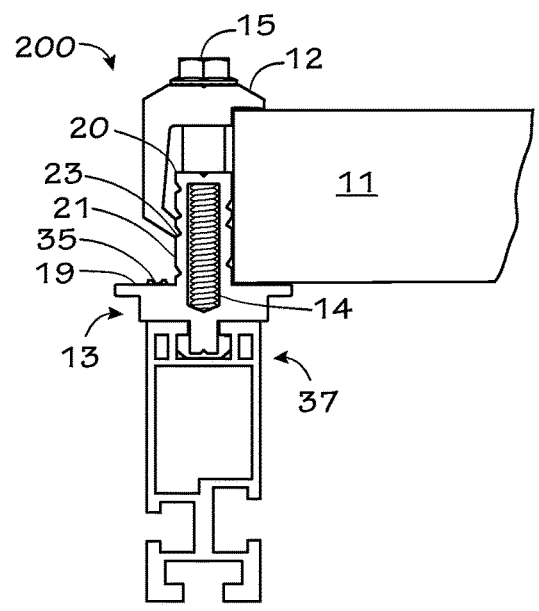
FIG. 13 illustrates in side elevation view, a portion of a rail-mounted embodiment of the solar panel mounting device adjusted to a second standard solar panel height.
Figure 14:
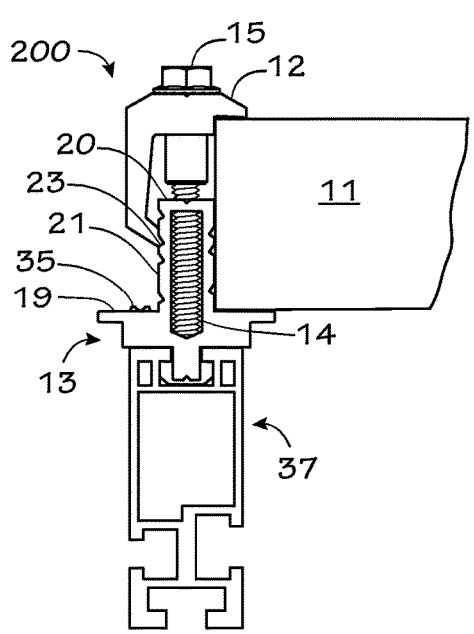
FIG. 14 illustrates in side elevation view, a portion of a rail-mounted embodiment of the solar panel mounting device adjusted to a third standard solar panel height.
Figure 15:
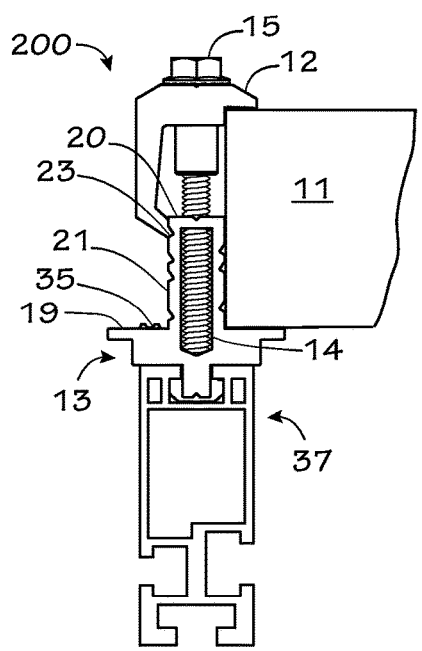
FIG. 15 illustrates in side elevation view, a portion of a rail-mounted embodiment of the solar panel mounting device adjusted to a fourth standard solar panel height.
Figure 16:
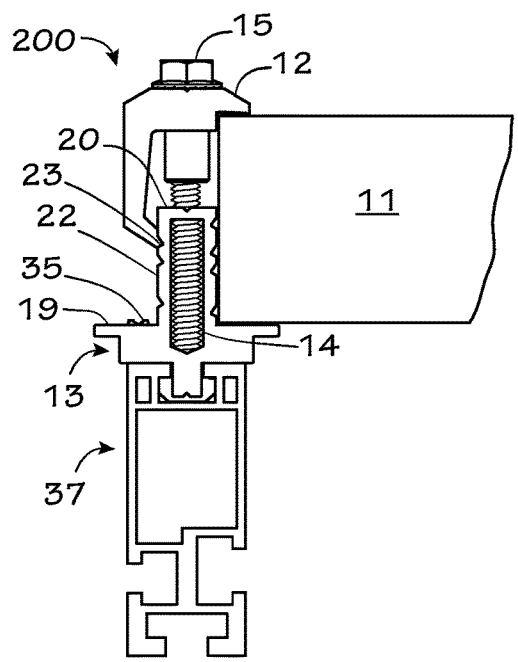
FIG. 16 illustrates in side elevation view, a portion of a rail-mounted embodiment of the solar panel mounting device adjusted to a fifth standard solar panel height.
Figure 17:
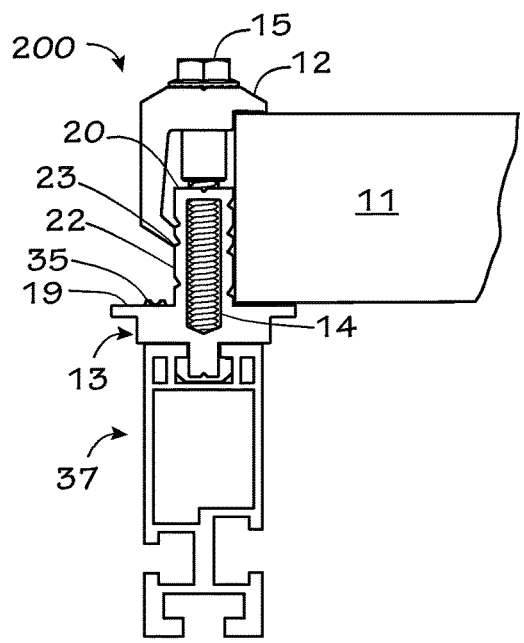
FIG. 17 illustrates in side elevation view, a portion of a rail-mounted embodiment of the solar panel mounting device adjusted to a sixth standard solar panel height.
Figure 18:
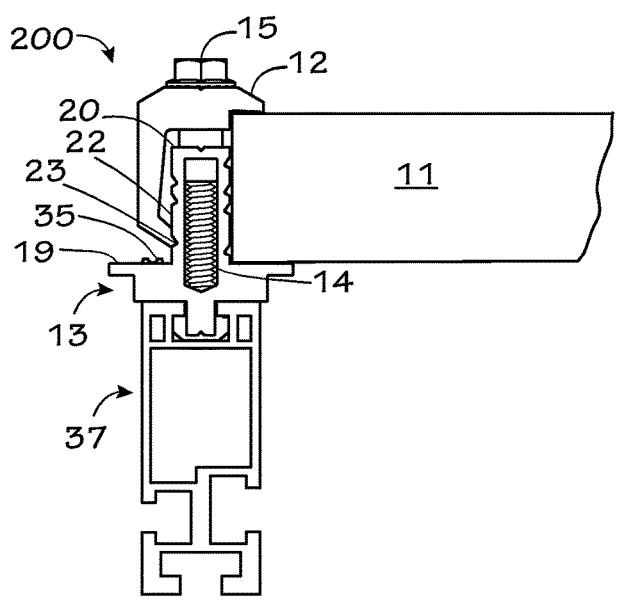
FIG. 18 illustrates in side elevation view, a portion of a rail-mounted embodiment of the solar panel mounting device adjusted to a seventh standard solar panel height.

FIGS. 5 and 12 illustrate the end clamp 12 adjusted to secure a solar panel 11 of a first standard thickness by engaging the lower most of the grooves 23 of the first outside surface 21. FIGS. 6 and 13 illustrates the end clamp 12 adjusted to secure a solar panel 11 of a second standard thickness by engaging the second lower most of the grooves 23 of the first outside surface 21. FIGS. 7 and 14 illustrate the end clamp 12 adjusted to secure a solar panel 11 of a third standard thickness by engaging the second highest of the grooves 23 of the first outside surface 21. FIGS. 8 and 15 illustrate the end clamp 12 adjusted to secure a solar panel 11 of a fourth standard thickness by engaging the highest of the grooves 23 of the first outside surface 21. FIGS. 9 and 16 illustrate the end clamp 12 adjusted to secure a solar panel 11 of a fifth standard thickness by engaging the lower most of the grooves 23 of the second outside surface 22. FIGS. 10 and 17 illustrate the end clamp 12 adjusted to secure a solar panel 11 of a sixth standard thickness by engaging the second lowest of the grooves 23 of the second outside surface 22. FIGS. 11 and 18 illustrate the end clamp 12 adjusted to secure a solar panel 11 of a seventh standard thickness by engaging the highest of the grooves 23 of the second outside surface 22.

In FIGS. 5-11 and FIGS. 12-18, ground pins 35 project out of the planar top surface 19 on either side of the alignment portion 20 and engage the bottom frame of the solar panel 11. In FIGS. 5-11, the opposing ends of each of the ground pins 35 project into an interior shelf 36 of the base 13. In FIGS. 12-18, each of the ground pins 35 projects into the top planar surface of the mounting rail 37.

In FIGS. 5-18 and throughout the disclosure, the threaded fastener 14 is shown engaging the hollow bolt 15. The rail-less device 100 and the rail-mounted device 200 is not limited to using this arrangement. A hex nut, collar nut, or similar thread engaging coupler can be substituted and therefore, the reader should not limit the claimed invention to the hollow bolt 15. The hollow bolt 15 can be used when it is desirable to limit the length of the threaded fastener 14, for example, so the threaded fastener 14 does not cast a shadow on the solar panel 11. The hollow bolt 15 can add stability when it projects into the alignment portion 20 in order to engage the threaded fastener 14, for example, in FIGS. 5, 9, 12, and 18.

Figure 19:
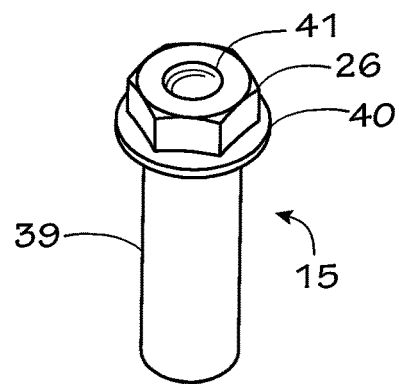
FIG. 19 illustrates a modified hollow bolt, of FIGS. 5-18, in top perspective view.
Figure 20:
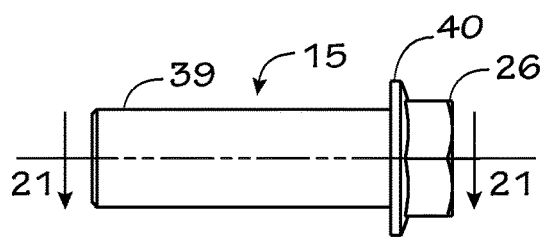
FIG. 20 illustrates the modified hollow bolt of FIG. 19 in side elevation view.
Figure 21:
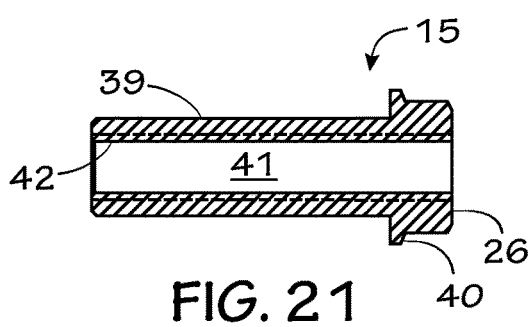
FIG. 21 illustrates a sectional view of the modified hollow bolt of FIG. 20 taken along section lines 21-21.
Figure 22:
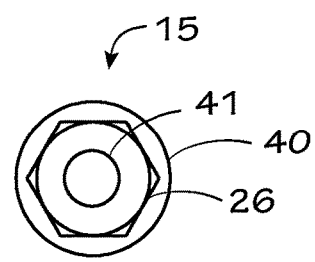
FIG. 22 illustrates a top plan view of the modified hollow bolt of FIG. 19.

FIGS. 19-22 illustrate the hollow bolt 15 in more detail. FIG. 19 illustrates a hollow bolt 15, in top perspective view. FIG. 20 illustrates the hollow bolt 15 of FIG. 18 in side view. FIG. 21 illustrates a sectional view of the hollow bolt 15 of FIG. 20 taken along section lines 21-21. FIG. 22 illustrates a top plan view of the hollow bolt 15 of FIG. 19. A bolt head 26 and a retaining collar 40 are illustrated in FIGS. 19-22. As illustrated in FIGS. 19-21, the hollow bolt 15 includes bolt body 39 extending directly away from the bolt head 26. The bolt body 39 is unthreaded on the outside surface in order to allow it pass freely through unthreaded apertures of commensurate size. The hollow bolt 15 is modified in the sense that instead of the bolt head 26 being solid, it includes a threaded aperture 41 that passes through the bolt head, as shown in FIGS. 19, 21, and 22. As best seen in FIG. 21, the threaded aperture 41 extends through the entire interior length of the bolt body 39 and the bolt head 26 thus allowing a portion of the threaded fastener 14 of FIGS. 5-18 to pass completely through the hollow bolt 15. The threaded aperture 41 includes threading 42 that engages the threading of the threaded fastener 14 of FIGS. 5-18.

Figure 23:
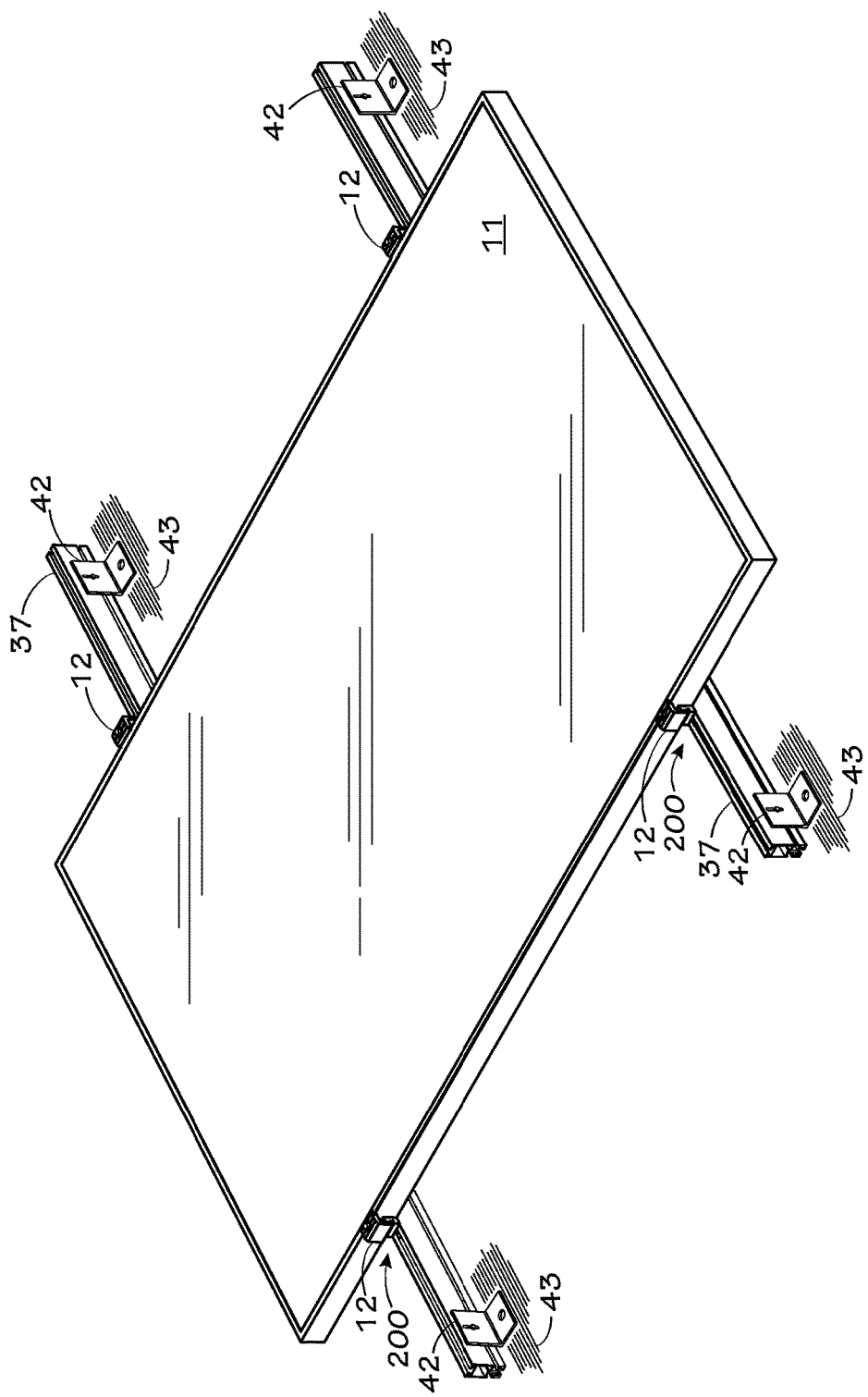
FIG. 23 illustrates, in top perspective view, the rail-mounted embodiment of the solar panel mounting device of FIGS. 12-18 shown with a solar panel mounted to a roof.
Figure 24:
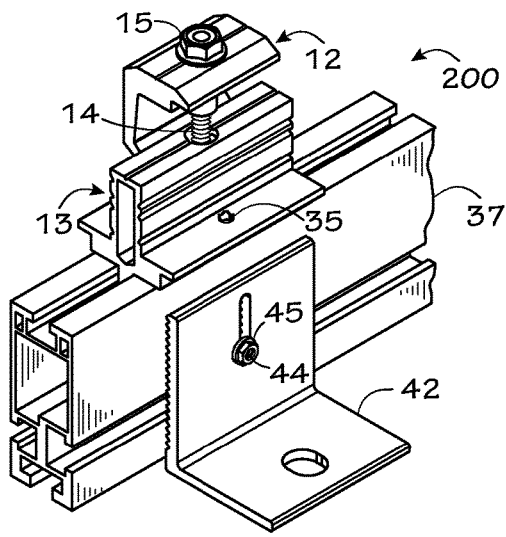
FIG. 24 illustrates in top perspective view, the rail-mounted embodiment of the solar panel mounting device including a portion of a rail and a roof mounting L-foot mounted on a roof.
Figure 26:
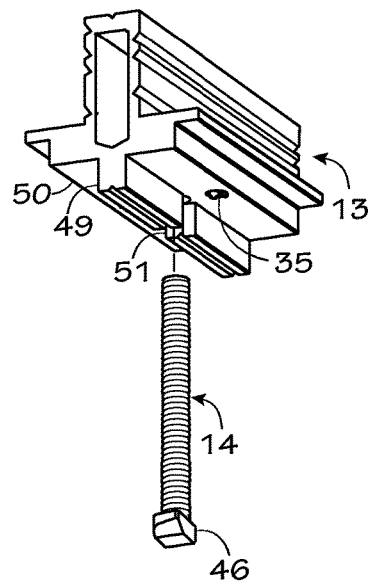
FIG. 26 illustrates an exploded and bottom perspective view of the base and threaded fastener of FIG. 24.
Figure 25:
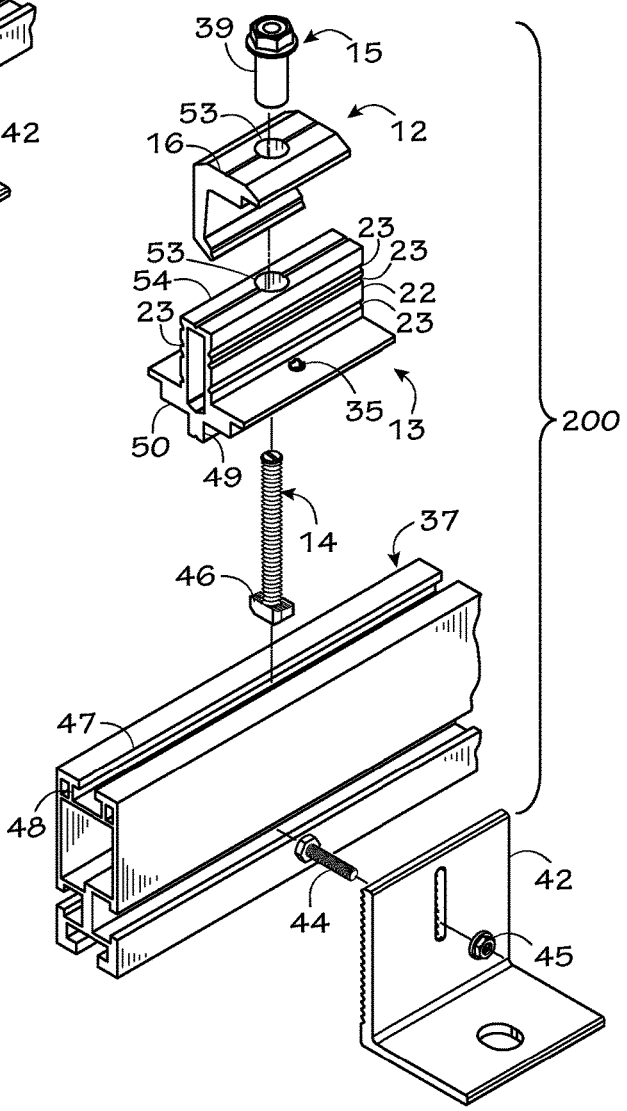
FIG. 25 illustrates an exploded and perspective view of FIG. 24.
Figure 27:
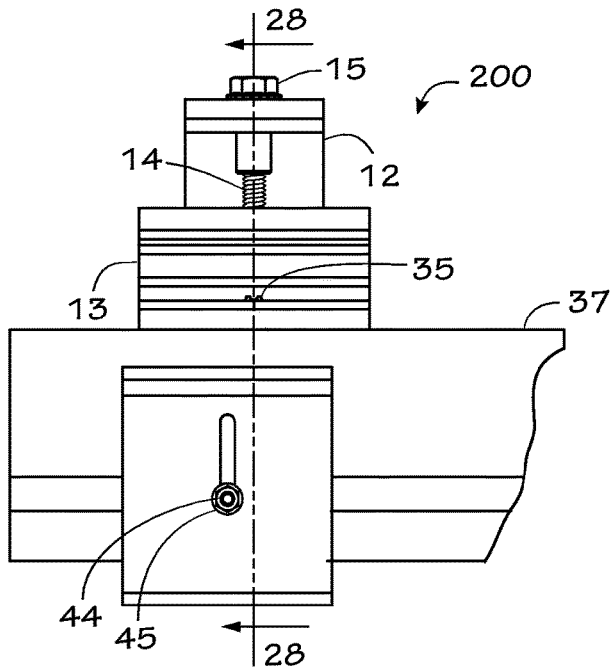
FIG. 27 illustrates a front plan view of FIG. 24.
Figure 28:
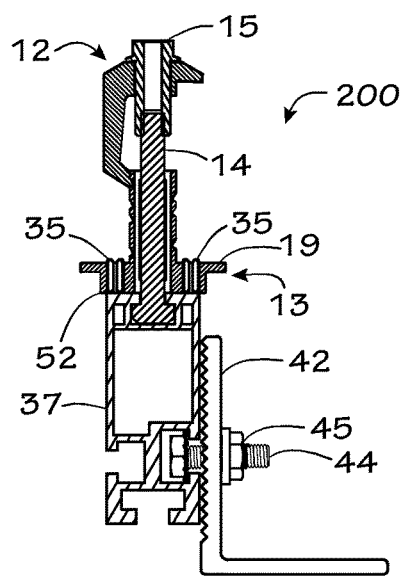
FIG. 28 illustrates a sectional view of FIG. 27 taken along section lines 28-28.
Figure 29:
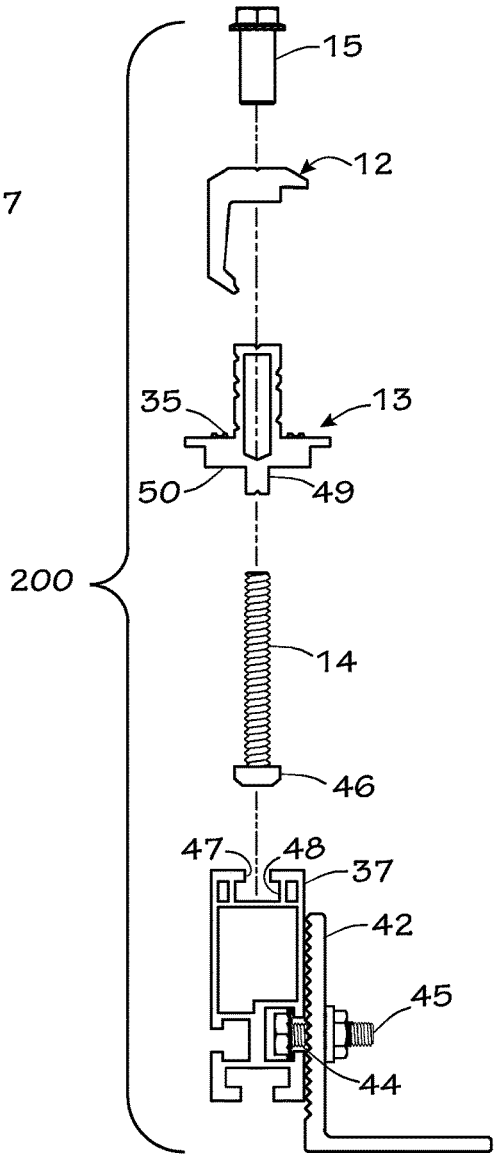
FIG. 29 illustrates an exploded and side view of FIG. 24.

FIGS. 23-25 and 27-29, illustrate the rail-mounted device 200 of FIGS. 12-18 illustrated with a portion of a mounting rail 37 and a roof mounting L-foot 42. FIG. 23 illustrates, in top perspective view, the device with a solar panel 11 mounted to a roof 43 with the solar panel 11 being engaged by the end clamp 12. FIG. 24 illustrates a portion of the rail-mounted assembly in top perspective view. FIG. 25 illustrates an exploded and perspective view of FIG. 24 and shows the grooves 23 extending longitudinally across the second outside surface 22. FIG. 26 shows a bottom exploded perspective view of the threaded fastener 14 and the base 13. FIG. 27 illustrates a front view of FIG. 24. FIG. 28 illustrates a sectional view of FIG. 27 taken along section lines 28-28. FIG. 29 illustrates an exploded side view of FIG. 24. FIGS. 24-25 and 27-29 illustrate the end clamp 12, base 13, mounting rail 37, threaded fastener 14, hollow bolt 15, roof mounting L-foot 42, ground pins 35, second threaded fastener 44 and nut 45.

In FIGS. 25-26 and 28-29, the threaded fastener 14 is shown as a t-bolt. Referring to FIGS. 25 and 29, the width of narrow profile of the t-bolt head 46 is narrower than the first rail slot opening 47 that runs longitudinally along the top of mounting rail 37. The width of the wide profile of the t-bolt head 46 is wider than the first rail slot opening 47 but narrower than the first rail slot body 48. This allows the threaded fastener 14 (i.e. t-bolt) to be inserted anywhere along the length of the mounting rail 37 but then be held in slidable captive cooperation simply by rotating the t-bolt 90-degrees. Referring to FIGS. 25, 26, and 28, the base 13 includes a second alignment portion 49 projecting vertically downward out of a planar bottom surface 50 of the base 13. Referring to FIG. 26, the second alignment portion 49 includes a transverse slot 51 cutting perpendicularly across the length of the second alignment portion 49. The width of the slot is wide enough to accept the narrow profile side of the t-bolt head 46 but narrow enough not to accept the wide profile side of the t-bolt head 46. In FIG. 28, the t-bolt head 46 is resting within the transverse slot 51 (FIG. 26) causing the planar bottom surface 50 (FIG. 26) to rest against the rail top surface 52 (FIG. 25).

In FIG. 28, as the hollow bolt 15 engages the threaded fastener 14, the solar panel (not shown) will be pushed against the ground pin 35 before seating co-planarly against the planar top surface 19. The ground pin 35 will be pushed through it aperture before settling against the rail top surface 52. The ground pin 35 is sharpened so that it will bite into both the solar panel and the rail top surface 52 breaking through any oxidation and making an electrical connection.

In FIG. 25, an aperture 53 in the upper clamping portion 16 of the end clamp 12 is sized to pass the bolt body 39 but small enough to allow the bolt head 26 to seat on the top surface of the upper clamping portion 16. In order to allow the bolt body 39, which is unthreaded, to pass through the aperture 53 freely, the aperture 53 of the upper clamping portion 16 is also unthreaded. An aperture 53 in the alignment portion top surface 54 is similarly sized to pass the bolt body 39. The alignment portion top surface 54 is illustrated as a horizontally planar surface. This aperture passes through the entire base body and through the top of the transverse slot 51 of FIG. 26.

Figure 30:
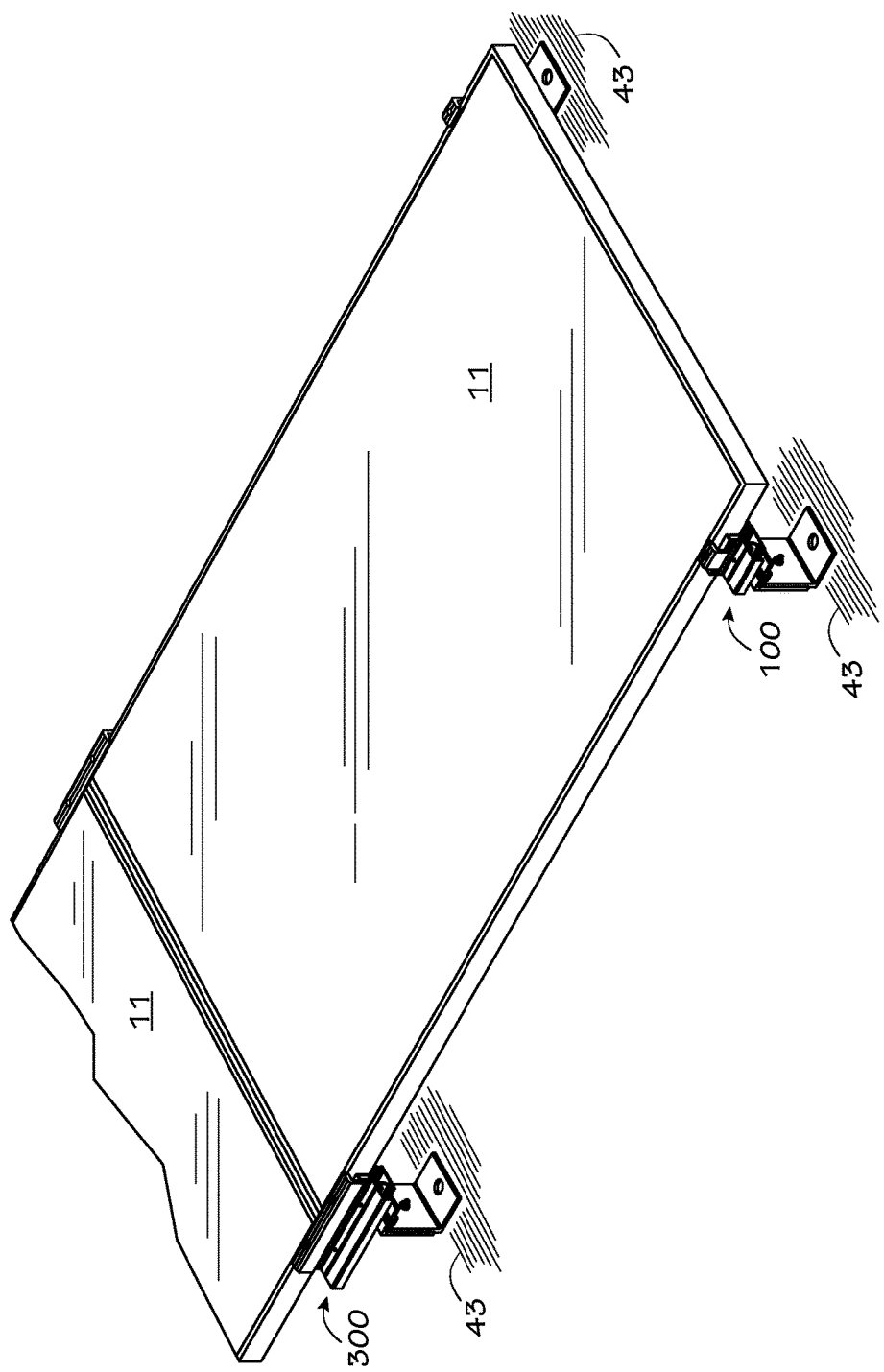
FIG. 30 illustrates, in top perspective view, the rail-less embodiment of the solar panel mounting device of FIGS. 5-11 shown with a solar panel mounted to a roof.
Figures 31, 32:
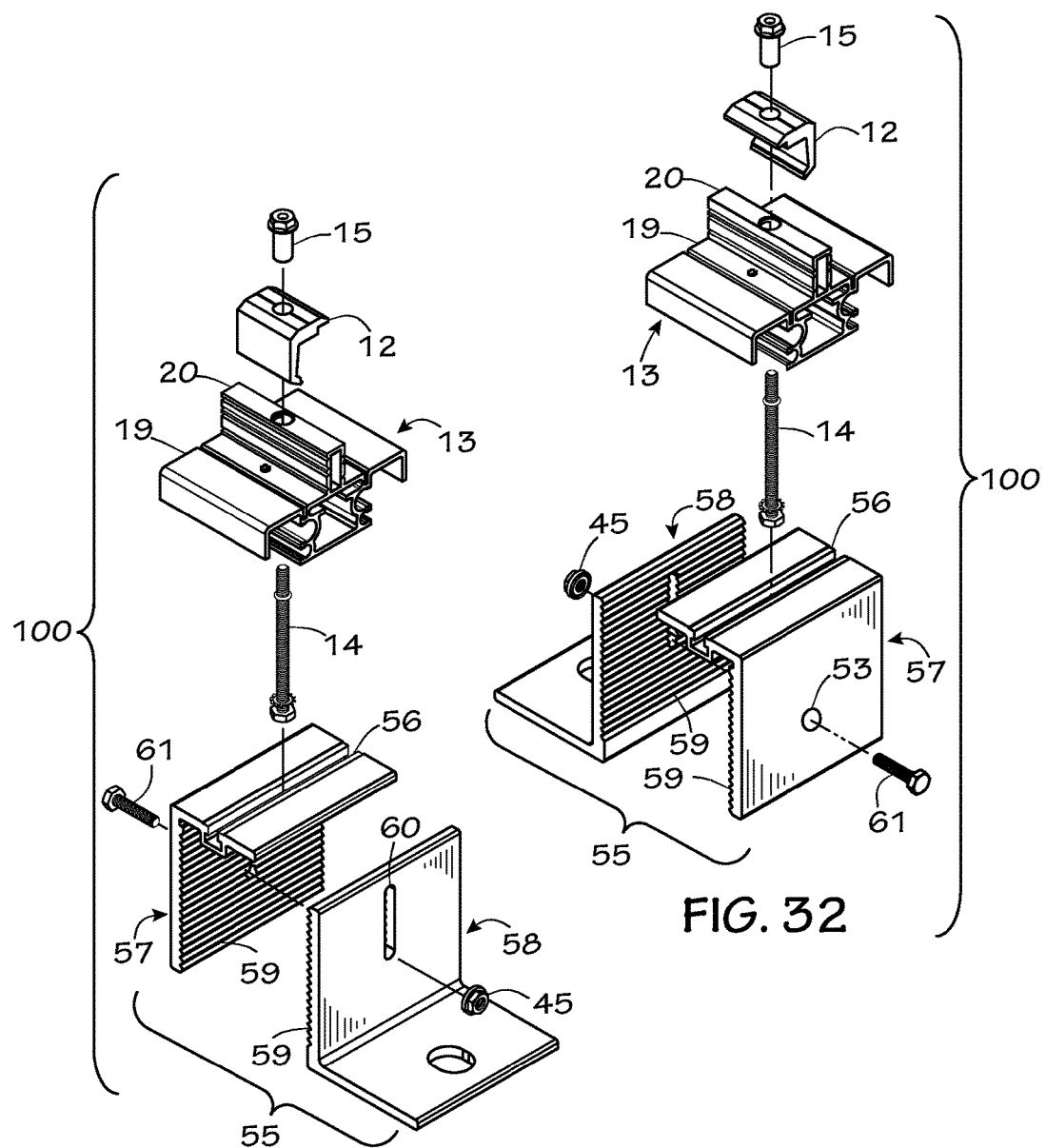
FIG. 31 illustrates, in top and front exploded perspective view, the rail-less embodiment of the solar panel mounting device.
FIG. 32 illustrates in top and rear exploded perspective view, the rail-less embodiment of the solar panel mounting device.
Figure 33:
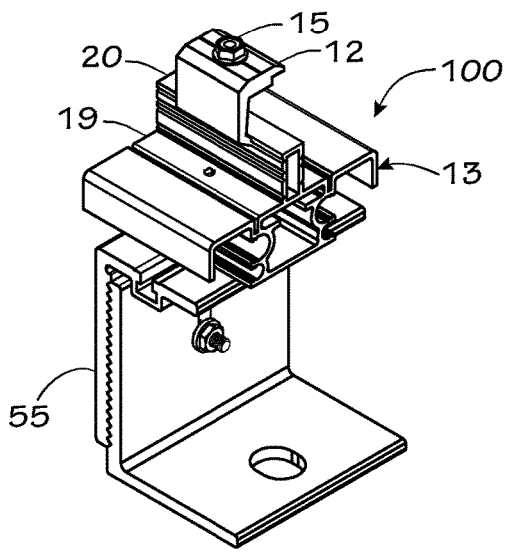
FIG. 33 illustrates in top and front perspective view, the rail-less embodiment of the solar panel mounting device.
Figure 36:
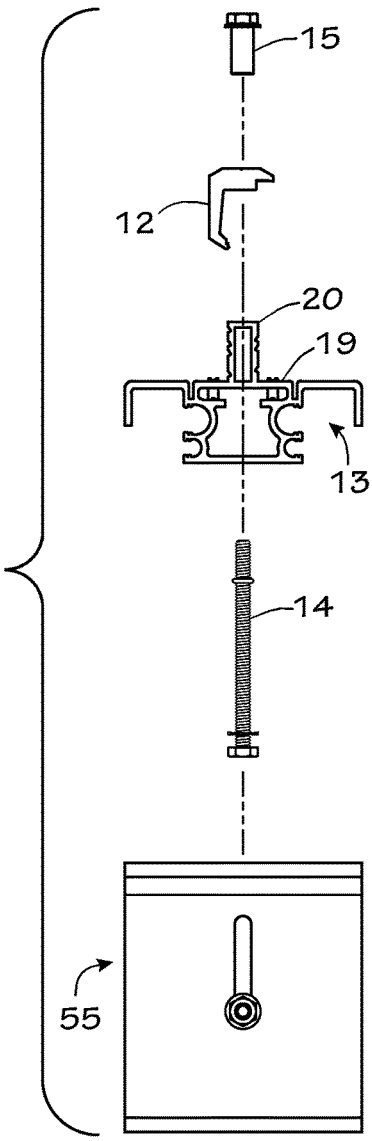
FIG. 36 illustrates front and exploded view of FIG. 33.
Figure 34:
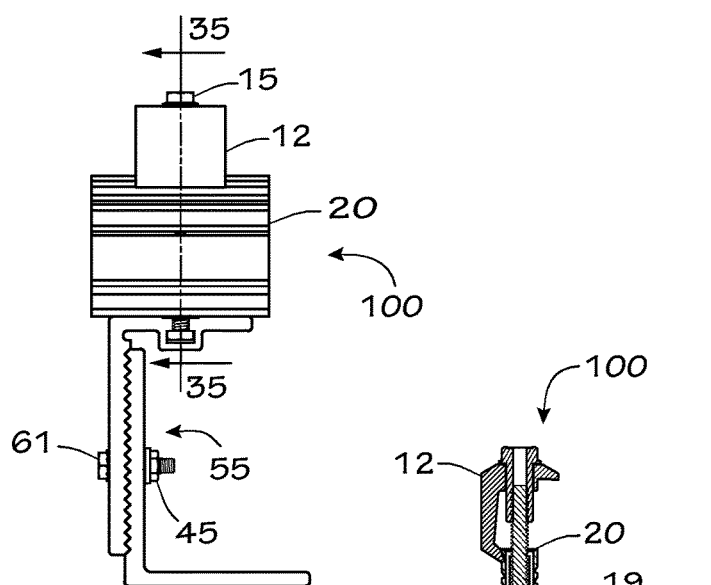
FIG. 34 illustrates a side elevation view of FIG. 33.
Figure 35:
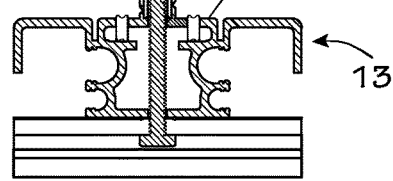
FIG. 35 illustrates a section-view of FIG. 34 taken along section lines 35-35.

FIGS. 30-36 illustrates the rail-less device 100 of the solar panel mounting device of FIGS. 5-11. FIG. 30 illustrates, in top perspective view, the rail-less embodiment 100 of the solar panel mounting device a solar panel mounted to a roof 43. FIG. 30 also illustrates a second rail-less embodiment 300 of the solar panel mounting device for bridging two solar panels. FIG. 31 illustrates, in top and front exploded perspective view, the rail-less embodiment 100 of the solar panel mounting device mounted on a roof. FIG. 32 illustrates in top and rear exploded perspective view, the rail-less device 100 of the solar panel mounting device mounted on a roof. FIG. 33 illustrates in top and front perspective view, the rail-less device 100 mounted on a roof. FIG. 34 illustrates a side view of FIG. 33. FIG. 35 illustrates a section-view of FIG. 34 taken along section lines 35-35.

This embodiment illustrates a height adjustable L-foot assembly 55 viewed in FIGS. 31-34 and 36 that can mount to the roof 43 of FIG. 30 using flashing or flashing-less roof mounting fastener systems. The device utilizes the same principle and components describe for FIGS. 1-4 and common to all disclosed embodiments. As illustrated in FIGS. 31-36, these include the end clamp 12, base 13, threaded fastener 14, and hollow bolt 15. The end clamp 12 can be configured as previously described in detail for FIGS. 1-4. The base includes the planar top surface 19 and alignment portion 20 projecting directly and perpendicularly upward from the planar top surface 19 as well as other operational features the clamps and secures the solar panel as previously described for FIGS. 1-4 and 5-11. The threaded fastener 14 is show as a hex head bolt. This can alternative be a t-bolt, square head bolt, or other threaded fasteners whose heads are capable of staying slidably captive with the L-bracket slotted groove 56 illustrated in FIG. 31-32.

Referring to FIGS. 31-32, the height adjustable L-foot assembly 55 includes an upper L-bracket 57 and a lower L-bracket 58 each with toothed surfaces 59 of complementary shape and size. The upper L-bracket includes an aperture 53 that aligns with a slotted aperture 60 vertically disposed in the lower L-bracket 58. The lower L-bracket 58 and upper L-bracket 57 can be height adjusted by engaging the toothed surfaces and secured by a second threaded fastener 61 and a nut 45 that engages the aperture 53 and the slotted aperture 60.

Figure 37:
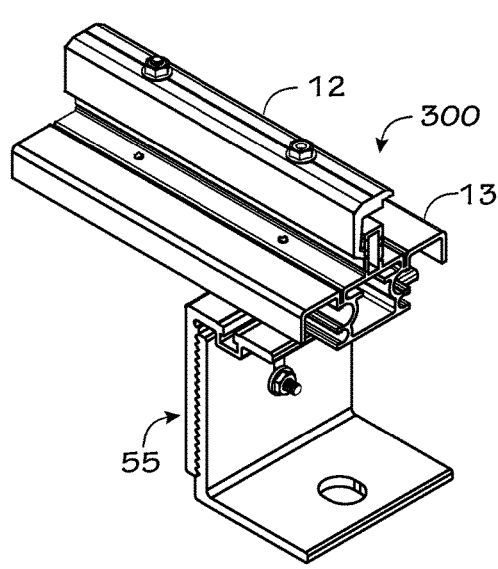
FIG. 37 illustrates, top and front perspective view, of a second rail-less embodiment of the solar panel mounting device from FIG. 30 for bridging two solar panels.
Figure 39:
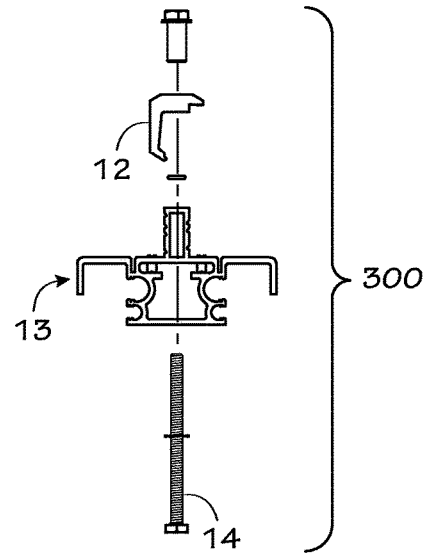
FIG. 39 illustrates the mounting device of FIG. 37 in front exploded view.
Figure 38:
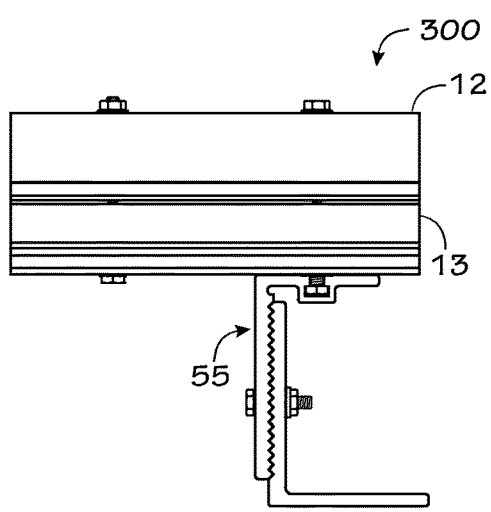
FIG. 38 illustrates the mounting device of FIG. 37 in side elevation view.
Figure 40:
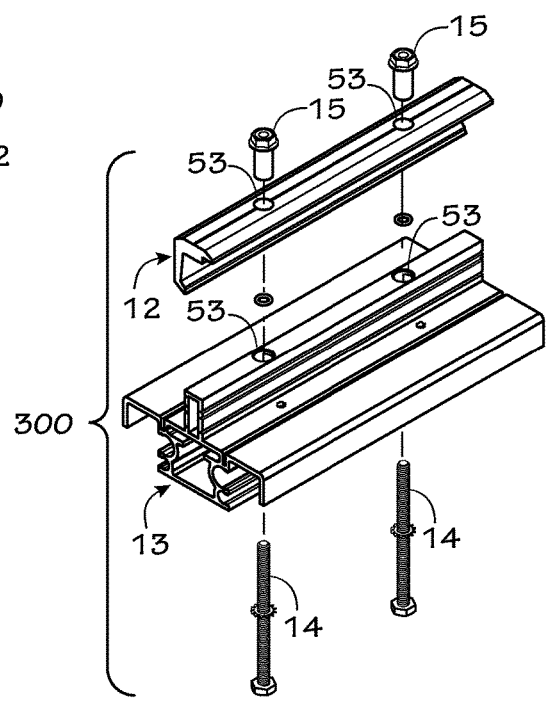
FIG. 40 illustrates the mounting device of FIG. 37 in exploded and rear perspective view.

FIGS. 37-40 illustrate, a second rail-less device 300 or bridge-clamp assembly of from FIG. 30 for bridging two solar panels. FIG. 37 illustrates, top and front perspective view, of the second rail-less device 300. FIG. 38 illustrates second rail-less device 300 of FIG. 37 in side view. FIG. 39 illustrates the end clamp 12 and base 13 assembly portion of FIG. 37 in front exploded view. FIG. 40 illustrates the end clamp 12 and base 13 assembly portion of FIG. 37 in exploded and rear perspective view. As illustrated in FIGS. 37-40, the second rail-less device 300 includes elongated versions of both the end clamp 12 and the base 13 of FIGS. 31-36. These utilize two or more threaded fasteners 14 and hollow bolt 15 as illustrated in FIGS. 39-40 that engage corresponding two or more of the apertures 53 in both the end clamp 12 and the alignment portion 20. The second rail-less device 300 utilizes the principles and structure described for FIGS. 1-4 and FIGS. 5-11. In addition, the height adjustable L-foot assembly 55 of FIGS. 37-38 utilizes the same structure and principles described for FIGS. 31-36.

A height adjustable device for mounting solar panels to a roof with associated solar panel racking systems in various embodiments has been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. A device (10, 100, 200, 300) for mounting a solar panel (11) to a roof (43), comprising:
    a base (13) including a planar top surface (19) and an alignment portion (20) projecting directly and perpendicularly upward from the planar top surface (19);
    an end clamp (12) including an upper clamping portion (16) positioned above the alignment portion (20), a mid-portion (17) projecting directly downward from the upper clamping portion (16), and an end portion (18) projecting directly and obliquely away from the mid-portion (17) and toward the alignment portion (20);
    the end portion (18) includes an upward facing outside surface (31), a downward facing outside surface (32), and a three-angle bearing surface (27) that engages co-planarly against both a first outside surface (21) and a groove (23) extending longitudinally within the first outside surface (21) of the alignment portion (20);
    the three-angle bearing surface (27) includes a first planar bearing surface (28) that directly and obliquely extends from the upward facing outside surface (31) and aligns vertically against the first outside surface (21) of the alignment portion (20), a second planar bearing surface (29) that directly and obliquely extends from the first planar bearing surface (28), and a third planar bearing surface (30) that extends directly and at an angle of 90-degrees or less with respect to the second planar bearing surface (29) and terminating at the downward facing outside surface (32) making an oblique angle therewith;
    a threaded fastener (14) projecting through the planar top surface (19) and the alignment portion (20) secures the upper clamping portion (16) to the base (13); and
    the upper clamping portion (16) engages and secures the solar panel (11) co-planarly against the planar top surface (19) and a second outside surface (22) of the alignment portion (20).

2. The device (10, 100, 200, 300) of claim 1, wherein:
    the first outside surface (21) and the second outside surface (22) each include two or more grooves (23) complementary in shape to the second planar bearing surface (29) and the third planar bearing surface (30) in combination; and
    each groove (23) of the two or more grooves (23) is positioned at a unique distance above the planar top surface (19).

3. The device (10, 100, 200, 300) of claim 1 further comprising:
    a hollow bolt (15) including a bolt body (39), the bolt body (39) including an unthreaded exterior surface and a threaded aperture (41) therein, the bolt body projecting downward through the upper clamping portion; and
    the threaded fastener (14) projecting upward through the alignment portion (20) and threadably engaging the threaded aperture (41).

4. The device (10, 100, 200, 300) of claim 3, wherein:
    the alignment portion (20) includes a closed planar top surface with and aperture therethrough; and
    the aperture (53) sized and shaped to receive the bolt body (39) therein.

5. The device (10, 100, 200, 300) of claim 1, further comprising:
    a hollow bolt (15) including a bolt body (39), the bolt body (39) including an unthreaded exterior surface and a threaded aperture (41) therein, the bolt body (39) projecting downward through the upper clamping portion (16); and
    the threaded fastener (14) projecting upward through the alignment portion (20) and threadably engaging the threaded aperture (41).

6. The device (10, 100, 200, 300) of claim 5, wherein:
    the alignment portion (20) includes a closed planar top surface with and aperture therethrough; and
    the aperture (53) sized and shaped to receive the bolt body (39) therein.

7. A device (10, 100, 200, 300) for mounting a solar panel (11) to a roof (43) comprising:
    a base (13) including a planar top surface (19) and an alignment portion (20);
    the alignment portion (20) including a first outside surface (21) and a second outside surface (22) each projecting directly and perpendicularly upward from the planar top surface (19) and dividing the planar top surface (19) into a first top surface portion and a second top surface portion, the first outside surface (21) including a groove (23) extending longitudinally therein;
    an end clamp (12) including an upper clamping portion (16) extending above the alignment portion (20) and over the first top surface portion and the second top surface portion, a mid-portion (17) projecting directly from the upper clamping portion (16) and downward toward the first top surface portion, and an end portion (18) projecting directly and obliquely away from the mid-portion (17) and toward the first outside surface (21);
    a threaded fastener (14) including a body projecting upward into the base (13) and the upper clamping portion (16);

the end portion (18) including an upward facing outside surface (31) and a downward facing outside surface (32), the end portion (18) terminates in a three-angle bearing surface (27);

the three-angle bearing surface (27) includes a first planar bearing surface (28) that directly and obliquely extends from the upward facing outside surface and aligns vertically against the first outside surface (21) of the alignment portion (20), a second planar bearing surface (29) that directly and obliquely extends from the first planar bearing surface (28), and a third planar bearing surface (30) that extends directly and at an angle of 90-degrees or less with respect to the second planar bearing surface (29) and terminating at an oblique angle with respect to the downward facing outside surface (32); and the groove (23) is complementary shaped to the second planar bearing surface (29) and the third planar bearing surface (30) in combination, and the groove (23) receives the second planar bearing surface (29) and the third planar bearing surface (30) therein.

8. The device (10, 100, 200, 300) of claim 7, wherein:
the first outside surface (21) and the second outside surface (22) each include two or more grooves (23) complementary in shape to the second planar bearing surface (29) and the third planar bearing surface (30) in combination; and
each groove (23) of the two or more grooves (23) is positioned at a unique distance above the planar top surface (19).

9. The device (10, 100, 200, 300) of claim 7 further comprising:
a hollow bolt (15) including a bolt body (39), the bolt body (39) including an unthreaded exterior surface and a threaded aperture (41) therein, the bolt body projecting downward through the upper clamping portion; and
the threaded fastener (14) projecting upward through the alignment portion (20) and threadably engaging the threaded aperture (41).

10. The device (10, 100, 200, 300) of claim 9, wherein:
the alignment portion (20) includes a closed planar top surface with and aperture (53) therethrough; and
the aperture (53) sized and shaped to receive the bolt body (39) therein.

* * * * *